United States Patent Office.

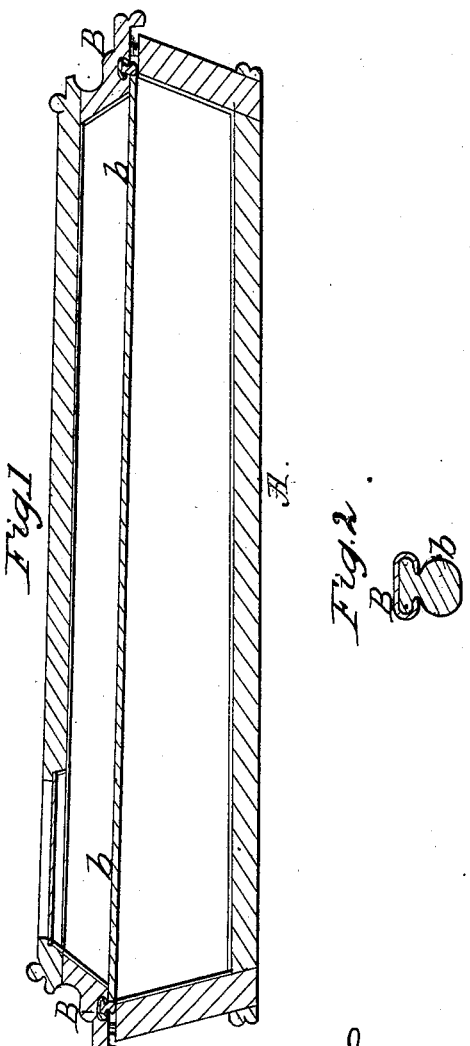

EDWARD ELLINGEN, OF MINERAL POINT, WISCONSIN.

Letters Patent No. 81,885, dated September 8, 1868.

IMPROVED COFFIN.

*The Schedule referred to in these Letters Patent and making part of the same.*

TO ALL WHOM IT MAY CONCERN:

Be it known that I, EDWARD ELLINGEN, of Mineral Point, in the county of Iowa, in the State of Wisconsin, have invented a new and improved Method and Plan of Making Air-Tight Coffins both of metal and wood; and I do hereby declare that the following is a full and exact description thereof, reference being had to the accompanying drawings, and to the letters of reference marked thereon.

Figure 1 represents a vertical longitudinal section of a wooden coffin, showing my improvements applied thereto, and Figure 2 a transverse section of the rubber packing, showing means for its application to a metallic coffin.

Similar letters of reference indicate corresponding parts.

The nature of my invention consists in making wood coffins as follows:

First, coat the inside of the coffin with an impervious composition or cement, made of resin and lard, or any grease or oil, mixed in suitable proportions.

Second, attach to the inner edge of the lid of the coffin, by glue or other means, a strip or belt of elastic rubber, made of India rubber, and represented in the drawing at A A.

In making metallic coffins, fasten the strip of rubber in the same place as in the wood coffins, but fasten the rubber on the lid by means of soldering with zinc.

The shape is represented by B and C in the drawing.

B is zinc.

C is rubber.

To enable others skilled in the art to make and use my invention, I will proceed to describe its construction and operation.

I construct my wood coffins in the usual manner; then make my coating of rosin and lard, mixed in suitable proportions, and put it on the inside of the coffin, while the composition is hot, with a brush, and smooth it with a hot iron; then attach the rubber to the inner edge of the lid, by glue or other means, then screw on the lid.

In metallic coffins, I solder the rubber on in the same place as I attach it in the wood coffins.

I solder with zinc or other suitable metal.

What I claim as my invention, and desire to secure by Letters Patent, is—

The coffin, coated upon the inside with a composition impervious to moisture, as described, and rendered air-tight by the India-rubber packing, $b$, let into the under surface of the lid, and held in place by the metallic strip B, as herein set forth and shown.

Dated, June 4, 1868.

EDWARD ELLINGEN.

Witnesses:
ALEX. WILSON,
GEO. S. PRATT.